July 5, 1938.  I. W. KNIGHT  2,122,426
FRANGIBLE LINK
Filed Feb. 6, 1937
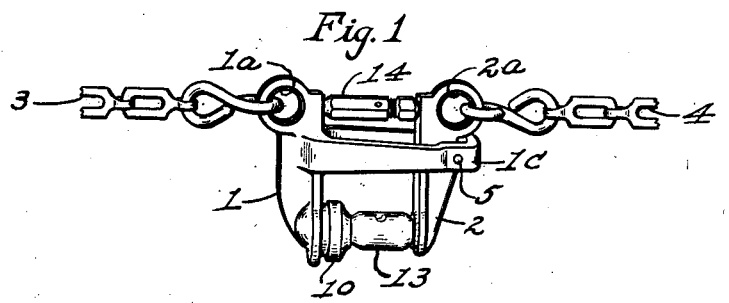
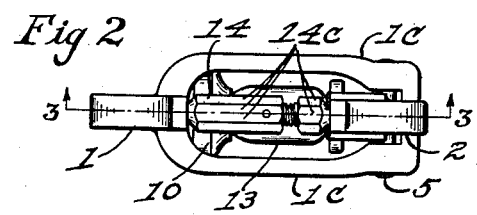
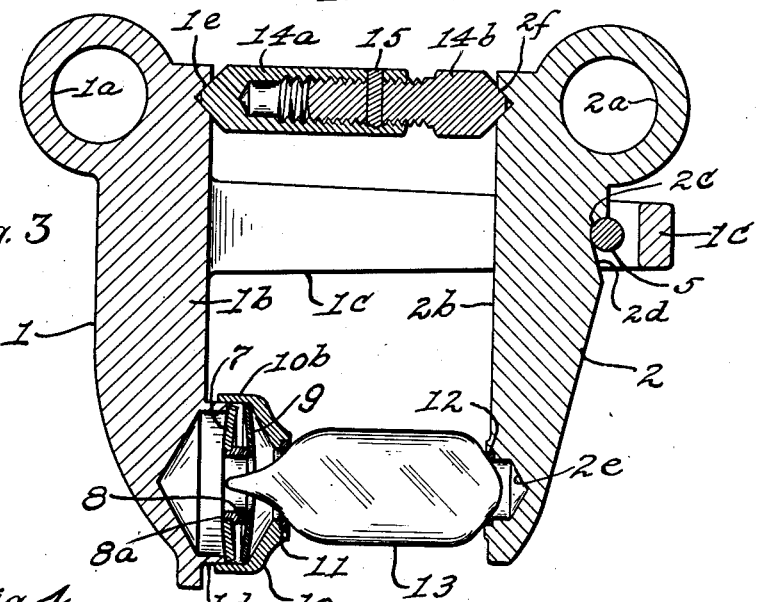
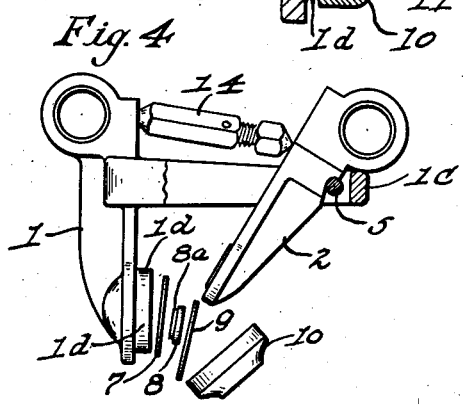
IRA W. KNIGHT
INVENTOR.
BY Harry Dexter Peck
ATTORNEY.

Patented July 5, 1938

2,122,426

UNITED STATES PATENT OFFICE 2,122,426

FRANGIBLE LINK

Ira W. Knight, Providence, R. I., assignor to General Fire Extinguisher Company, Providence, R. I., a corporation of Delaware Application February 6, 1937, Serial No. 124,437

2 Claims. (Cl. 169—42)

This invention relates to improvements in frangible links. More especially it has to do with improvements in links of the type disclosed in my Letters Patent No. 1,816,016 granted July 28, 1931.

The link here and as disclosed in the said patent has for its destructible element a frangible vessel charged with a highly expansible fluid adapted upon being heated to a predetermined degree to destroy said vessel and thereby release the link. It is likewise a feature of the improved link to have separable members arranged with respect to each other and with the frangible vessel so that the force imposed on the latter is one of compression, although the separable members themselves are both pulled by the respective ties to which they are connected.

It is among the objects of the present improvements to provide on one of the separable members an integral yoke with pivotal mounting for the other member, said yoke and mounting being so disposed and arranged that upon the destruction of the frangible vessel one member will swing about said mounting and slide on the other member so as to free itself, and, if necessary, to clear away other separable parts should they happen to remain in its path. These said other separable parts are provided in keeping with another object of the present invention which has to do with the establishment of an initial load on the frangible vessel so that the link as a whole may be assembled at the factory under predetermined conditions and then shipped ready for attachment to the ties. In connection with this load establishing feature the improved link embodies a resilient seat for the frangible vessel whereby the maximum load imposed upon it can be definitely predetermined.

In the accompanying drawing:

Figure 1 is a perspective of a link embodying the present improvements;

Figure 2 is a view looking downward on the link as disposed in Figure 1;

Figure 3 is a section, somewhat enlarged, taken as on line 3—3 of Figure 2; and

Figure 4 is a view, with a part of the yoke broken away, illustrating the relative movements of the members following the destruction of the frangible vessel.

Referring more particularly to the drawing, the link has separable members 1 and 2 each having an eye, 1a and 2a, respectively for engagement with force exerting ties 3 and 4. From what might be termed the body portion 1b of the member 1, there extends a yoke 1c which carries an axle pin 5 near its end remote from the said body portion. This pin serves as a pivotal mounting for the other member 2 which has on its body portion 2b a sort of groove adapted to receive the pin 5. This groove has a cylindrical surface 2c which merges into an inclined surface 2d so that while the member 2 may rotate slightly on the pin 5 it can also easily slide thereover along this inclined surface.

At one end of the body portion 1b of member 1, on the side or face opposite the other member 2, is a raised flange 1d on which rests a so-called resilient seat. This seat comprises a resilient disk 7 whose outer edge rests against the edge of the flange. This disk has a hole at its center into which fits a strut stem or sleeve portion 8a of a ring spacer 8. Against the latter rests another resilient disk 9 likewise having a hole at its center. Against the outer edge of this second disk rests a flanged cap 10. This likewise has a center hole with a recessed outer edge to receive a soft copper ring 11. The flange 10b of the cap extends besides the disks 7 and 9 and partially surrounds the flange 1d on the member 1. The corresponding end of the other member 2 is provided with a conical recess 2e having a recessed outer edge to receive a soft copper ring 12.

Between the resilient seat and recess 2e is placed a frangible vessel 13 made in the form of a short cylindrical tube both ends of which are sealed. The end resting against the copper ring 12, is sealed before the tube is charged and is preferably generally spherical. The opposite end of the vessel is drawn out during the shaping to form a short, somewhat conical snout. After the vessel has been charged with a highly expansible fluid through this snout, the latter is also sealed thereby entrapping the fluid in the vessel. This end of the vessel rests on the other copper ring 11 and its snout may project into one or more of the holes in the cap 10 and disks 7 and 9, and the spacer 8.

At the eye ends of the members 1 and 2, on opposed faces thereof, are provided conical seats 1e and 2f to receive an adjustable strut 14. This comprises a female portion 14a and a male portion 14b both suitably threaded and provided with wrench engaging surfaces 14c. The conical ends of this strut rest on the conical seats 1e and 2f of the members 1 and 2, and by relative rotation of the male and female portions the eye end of member 2 can be forced away from the eye end of member 1. This causes member 2 to rotate on the pivotal mounting provided by the pin 5 and swing the opposite end of member 2 toward member 1. This, of course, pushes the frangible vessel toward its resilient seat. During this adjustment of the link, the disks 7 and 9 both yield, and the cap 10 moves toward the member 1.

In order that no undue loading or mal-adjustment of the link shall occur in the field, both the female and male members of the strut are preferably drilled partly through and a pin 15 is driven into the hole to bind them together, the exposed end of the pin being cut off flush with the surface of the female member so it can not be withdrawn.

Thus in the assembly of the link there is imposed upon the frangible vessel a limited maximum load. If later, when the link has been attached to its respective ties, a sudden unexpected pull is applied to the link, the resilient disks will yield slightly and cushion the force of such pull, thus saving the frangible vessel from excessive compressive strain. Likewise if the link is hit accidentally, or even if the yoke should stretch so that the distance between the members 1 and 2 should be slightly increased, the resilient disks compensate for such change and continue to hold the parts against undue separation.

When the link is subjected to a rise of temperature great enough to effect shattering of the frangible vessel, the member 2 is first rotated slightly on the pin 5 and then slides over this pin and out of the yoke. Simultaneously with the rotation of member 2 the strut 14 of course starts to fall, but since this is in the path of movement of the member 2, the strut is thrown upward and away from the yoke. Although of no consequence, the destruction of the frangible vessel permits the resilient disks to snap back to their normal flat shape and this action separates the resilient seat from the flange of member 1, more or less as indicated in Figure 4.

I claim:

1. A frangible link comprising, in combination, members adapted to be connected to ties and separably connected to each other; one of said members having a yoke outstanding therefrom to provide a support for the other of said members; said other member being pivotally mounted on said support intermediate its ends; and means interposed between said members on opposite sides of said pivotal mounting for holding said members normally inseparable; one of said means being adapted to give way upon being heated to a predetermined temperature and thereby permit separation of said members.

2. A frangible link comprising, in combination, members adapted to be connected to ties and separably connected to each other; one of said members having a yoke outstanding therefrom to provide a support for the other of said members; said other member being pivotally mounted on said support intermediate its ends; and means interposed between said members on opposite sides of said pivotal mounting for holding said members normally inseparable; one of said means being a heat responsive element under compression and the other of said means being adjustable to determine the compressive load on said element.

IRA W. KNIGHT.